US012585446B2

(12) United States Patent
Elmenshawy et al.

(10) Patent No.: US 12,585,446 B2
(45) Date of Patent: Mar. 24, 2026

(54) CONSENT-DRIVEN ACCESS MANAGEMENT FOR CLOUD RESOURCES

(71) Applicant: Oracle International Corporation, Redwood Shores, CA (US)

(72) Inventors: Ayman Mohamed Aly Hassan Elmenshawy, Bellevue, WA (US); Daniel M. Vogel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 18/647,781

(22) Filed: Apr. 26, 2024

(65) Prior Publication Data

US 2024/0364707 A1     Oct. 31, 2024

Related U.S. Application Data

(60) Provisional application No. 63/462,875, filed on Apr. 28, 2023.

(51) Int. Cl.
G06F 8/60          (2018.01)
G06F 9/50          (2006.01)
          (Continued)

(52) U.S. Cl.
CPC .............. G06F 8/60 (2013.01); G06F 9/5005 (2013.01); H04L 9/3213 (2013.01);
          (Continued)

(58) Field of Classification Search
CPC ....... G06F 8/60; G06F 9/5005; H04L 9/3213; H04L 41/0806; H04L 41/0869; H04L 63/108; H04L 67/10
          (Continued)

(56) References Cited

U.S. PATENT DOCUMENTS 9,092,502 B1     7/2015  Cannaliato et al.
9,306,814 B1     4/2016  Roth et al.
          (Continued)

FOREIGN PATENT DOCUMENTS

EP          2893685 B1     7/2017
EP          3429156 A1     1/2019
          (Continued)

OTHER PUBLICATIONS

"Create a Reseller and Reseller Administrator User", Retrieved from https://abiquo.atlassian.net/wiki/spaces/ABI54/pages/310740667/ Create+a+Reseller+and+Reseller+Administrator+User, May 3, 2022, pp. 1-5.
          (Continued)

*Primary Examiner* — Liang Che A Wang
(74) *Attorney, Agent, or Firm* — Invoke

(57)          ABSTRACT

Techniques for consent-driven access management include: receiving, from a requestor, a request for consent for an actor to access a target set of resources in a cloud environment; identifying a consent workflow that specifies a name and/or an attribute of a set of one or more users from which to obtain respective approvals of the consent request; traversing the consent workflow to obtain the respective approvals from the set of one or more users; determining that one or more access policies, separate from the consent workflow, permit the actor to access the target set of resources; where access by the actor to the target set of resources is conditioned on both (a) obtaining the respective approvals from the set of one or more users and (b) determining that the one or more access policies, separate from the consent workflow, permit the actor to access the target set of resources.

19 Claims, 14 Drawing Sheets

(51) Int. Cl.

| | |
|---|---|
| *G06Q 30/015* | (2023.01) |
| *H04L 9/32* | (2006.01) |
| *H04L 9/40* | (2022.01) |
| *H04L 41/0806* | (2022.01) |
| *H04L 41/0869* | (2022.01) |
| *H04L 67/10* | (2022.01) |

(52) U.S. Cl.

CPC ...... *H04L 41/0806* (2013.01); *H04L 41/0869* (2013.01); *H04L 63/108* (2013.01); *H04L 67/10* (2013.01); *G06Q 30/015* (2023.01)

(58) Field of Classification Search

USPC ...................................... 726/1; 709/225, 229

See application file for complete search history.

(56) References Cited

U.S. PATENT DOCUMENTS

| | | | |
|---|---|---|---|
| 9,438,599 | B1 | 9/2016 | Yuhan et al. |
| 9,722,895 | B1 | 8/2017 | Sarukkai et al. |
| 9,985,947 | B1 | 5/2018 | Elhard |
| 10,757,574 | B1 | 8/2020 | Rule et al. |
| 10,878,483 | B1 | 12/2020 | Felbinger et al. |
| 11,552,953 | B1 | 1/2023 | Avadhanam |
| 11,720,536 | B1 | 8/2023 | Kisser et al. |
| 2002/0198973 | A1 | 12/2002 | Besaw |
| 2003/0154407 | A1 | 8/2003 | Kato et al. |
| 2010/0212004 | A1 | 8/2010 | Fu |
| 2013/0054426 | A1 | 2/2013 | Rowland et al. |
| 2013/0297711 | A1 | 11/2013 | Nhu |
| 2013/0304925 | A1 | 11/2013 | Ferris et al. |
| 2014/0280595 | A1 | 9/2014 | Mani et al. |
| 2015/0180949 | A1* | 6/2015 | Maes .................... G06F 9/5072 709/201 |
| 2015/0363852 | A1 | 12/2015 | Vautour |
| 2016/0043909 | A1 | 2/2016 | Pogrebinsky et al. |
| 2016/0142211 | A1 | 5/2016 | Metke et al. |
| 2016/0277411 | A1 | 9/2016 | Dani et al. |
| 2017/0230229 | A1 | 8/2017 | Sasturkar et al. |
| 2018/0052861 | A1 | 2/2018 | Seetharaman et al. |
| 2018/0219784 | A1 | 8/2018 | Jiang et al. |
| 2018/0234256 | A1 | 8/2018 | Bowen |
| 2019/0087835 | A1 | 3/2019 | Schwed et al. |
| 2019/0097812 | A1* | 3/2019 | Toth ...................... H04L 9/0841 |
| 2019/0156000 | A1 | 5/2019 | Hoffmann et al. |
| 2019/0166007 | A1 | 5/2019 | Sundaram et al. |
| 2019/0205045 | A1 | 7/2019 | Hugot et al. |
| 2020/0014659 | A1 | 1/2020 | Chasman et al. |
| 2020/0112497 | A1 | 4/2020 | Yenumulapalli et al. |
| 2020/0117757 | A1 | 4/2020 | Yanamandra et al. |
| 2020/0358756 | A1 | 11/2020 | Rose et al. |
| 2021/0216190 | A1 | 7/2021 | Vakil et al. |
| 2021/0234864 | A1 | 7/2021 | Dube et al. |
| 2021/0273914 | A1 | 9/2021 | Cobb |
| 2021/0279109 | A1 | 9/2021 | Ji et al. |
| 2021/0377272 | A1 | 12/2021 | Dasari et al. |
| 2021/0392142 | A1 | 12/2021 | Stephens et al. |
| 2022/0091947 | A1 | 3/2022 | Kothari et al. |
| 2022/0103618 | A1 | 3/2022 | Pinheiro et al. |
| 2022/0150124 | A1 | 5/2022 | Cooley et al. |
| 2022/0255902 | A1 | 8/2022 | Woodson |
| 2022/0294818 | A1 | 9/2022 | Parekh et al. |
| 2022/0335340 | A1 | 10/2022 | Moustafa et al. |
| 2022/0374271 | A1 | 11/2022 | Pogrebinsky et al. |
| 2023/0109926 | A1 | 4/2023 | Nair et al. |
| 2023/0132478 | A1 | 5/2023 | Robinson et al. |
| 2023/0316348 | A1 | 10/2023 | Dageville et al. |
| 2023/0342179 | A1 | 10/2023 | Suttle et al. |
| 2023/0362161 | A1 | 11/2023 | Spector et al. |
| 2023/0385286 | A1 | 11/2023 | Glickman et al. |
| 2023/0418979 | A1* | 12/2023 | DeLuca .................. G06F 9/451 |
| 2024/0054063 | A1 | 2/2024 | Wichelman et al. |
| 2024/0095739 | A1 | 3/2024 | Adogla et al. |
| 2024/0320240 | A1 | 9/2024 | Podder |
| 2024/0364707 | A1* | 10/2024 | Elmenshawy ...... H04L 41/0869 |
| 2024/0422215 | A1* | 12/2024 | Khan ..................... H04L 67/63 |

FOREIGN PATENT DOCUMENTS

| | | | | |
|---|---|---|---|---|
| EP | 3271857 | B1 | 4/2020 | |
| KR | 20140066616 | A * | 6/2014 | ............ G06F 9/448 |
| WO | 2014/039921 | A1 | 3/2014 | |
| WO | 2018/010791 | A1 | 1/2018 | |
| WO | 2021/145894 | A1 | 7/2021 | |
| WO | 2021/150306 | A1 | 7/2021 | |
| WO | 2021/150307 | A1 | 7/2021 | |
| WO | 2021/174104 | A1 | 9/2021 | |

OTHER PUBLICATIONS

"General Variables for All Requests", Jun. 28, 2023, pp. 6.

"Overview of Access Approval", Retrieved from https://cloud.google.com/assured-workloads/access-approval/docs/overview, Jun. 6, 2024, pp. 5.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"Policy Syntax", Jan. 4, 2023, pp. 7.

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, pp. 12.

"Verbs", Jun. 5, 2023, pp. 2.

Anonymbus: "Tokenization -(data security)", Wikipedia, Feb. 12, 2023, pp. 1-12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

Ducharme et al., "Seamlessly Protect Your IBM Cloud Application Infrastructure with Privileged Access Gateway", Oct. 3, 2022, pp. 13.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

Anonymous: "Oracle Cloud Infrastructure Documentation—Security Guide for Exadata Database Service on Cloud@Customer Systems", Apr. 1, 2023, XP093181902.

Anonymous: "Oracle Cloud Infrastructure Documentation-Overview of IAM", Feb. 8, 2023, XP093184083.

Anonymous: "Oracle Cloud Infrastructure Documentation-Renaming a Cloud Account", May 14, 2021, XP093185071.

Anonymous: "Oracle Cloud Infrastructure Documentation-Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

Anonymous: "Oracle Cloud Infrastructure Documentation—Getting Started with Policies", Jan. 4, 2023, XP093184099.

Anonymous: "Oracle Cloud Infrastructure Documentation—Getting Summary Information on the Overview Page", Aug. 16, 2022, XP093183031.

(56) References Cited

OTHER PUBLICATIONS

Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation-Overview of the Console Dashboards Service", Mar. 14, 2023, XP093184740.
Anonymous: "Oracle Cloud Infrastructure Documentation-Prerequisites for Oracle Platform Services on Oracle Cloud Infrastructure", Mar. 23, 2023, XP093185058.
Anonymous: "Oracle Cloud Infrastructure Documentation-Welcome to Oracle Cloud Infrastructure", Mar. 23, 2023, XP093182493.

Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

* cited by examiner

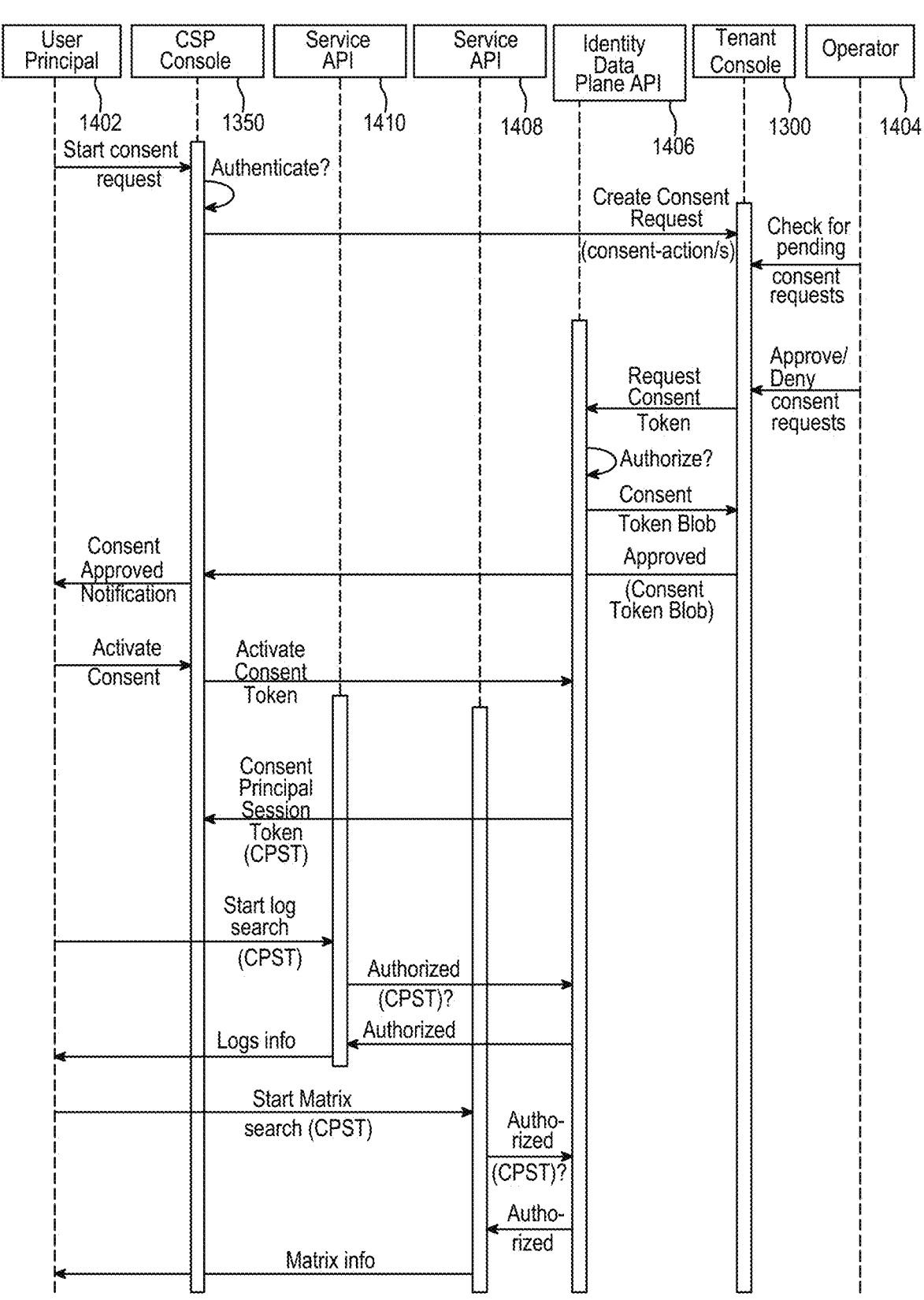
FIG. 14    1400

CONSENT-DRIVEN ACCESS MANAGEMENT FOR CLOUD RESOURCES

INCORPORATION BY REFERENCE; DISCLAIMER

Each of the following applications are hereby incorporated by reference: Application No. 63/462,875 filed on Apr. 28, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to cloud environments. More particularly, the present disclosure relates to access management in a cloud partition of a cloud environment.

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premises data center, software application framework, or other information technology infrastructure.

A Cloud Service Provider (CSP) is an entity providing a cloud service to tenants of the cloud environment. When another entity, such as the above-mentioned organization, starts subscribing to a cloud service provided by the CSP, that entity becomes a CSP customer and a tenant of the CSP's cloud environment. A CSP's customers may include merchants, service providers, payment processors, and/or other entities utilizing cloud services.

A cloud environment enables the provisioning of resources across multiple cloud partitions. The cloud system further enables on-demand network access to a shared pool of cloud computing resources (e.g., networks, servers, storage, applications, and services) that can be provisioned, deployed, and instantiated for respective customers. The CSP manages and configures the hardware (e.g., networking infrastructure, processors, memory, etc.) required for providing cloud services, controls the provisioning of cloud services, and delivers the cloud services through network access. The cloud system may allocate cloud partitions for respective customers, to manage and maintain for the customers' respective application and service needs. To ensure sufficient resources to meet those needs, the CSP typically retains full access control over any resources in the cloud partition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 13A specifically illustrates an example GUI for use by the first entity to request consent for an actor to access a target set of resources in a cloud partition of the second entity, and FIG. 13B illustrates an example GUI for use by the second entity in granting/denying the requested consent transaction.

FIG. 14 illustrates an example sequence of interactions between different components of a system for consent-driven access management in a cloud partition of a cloud environment.

DETAILED DESCRIPTION

Figure 1:
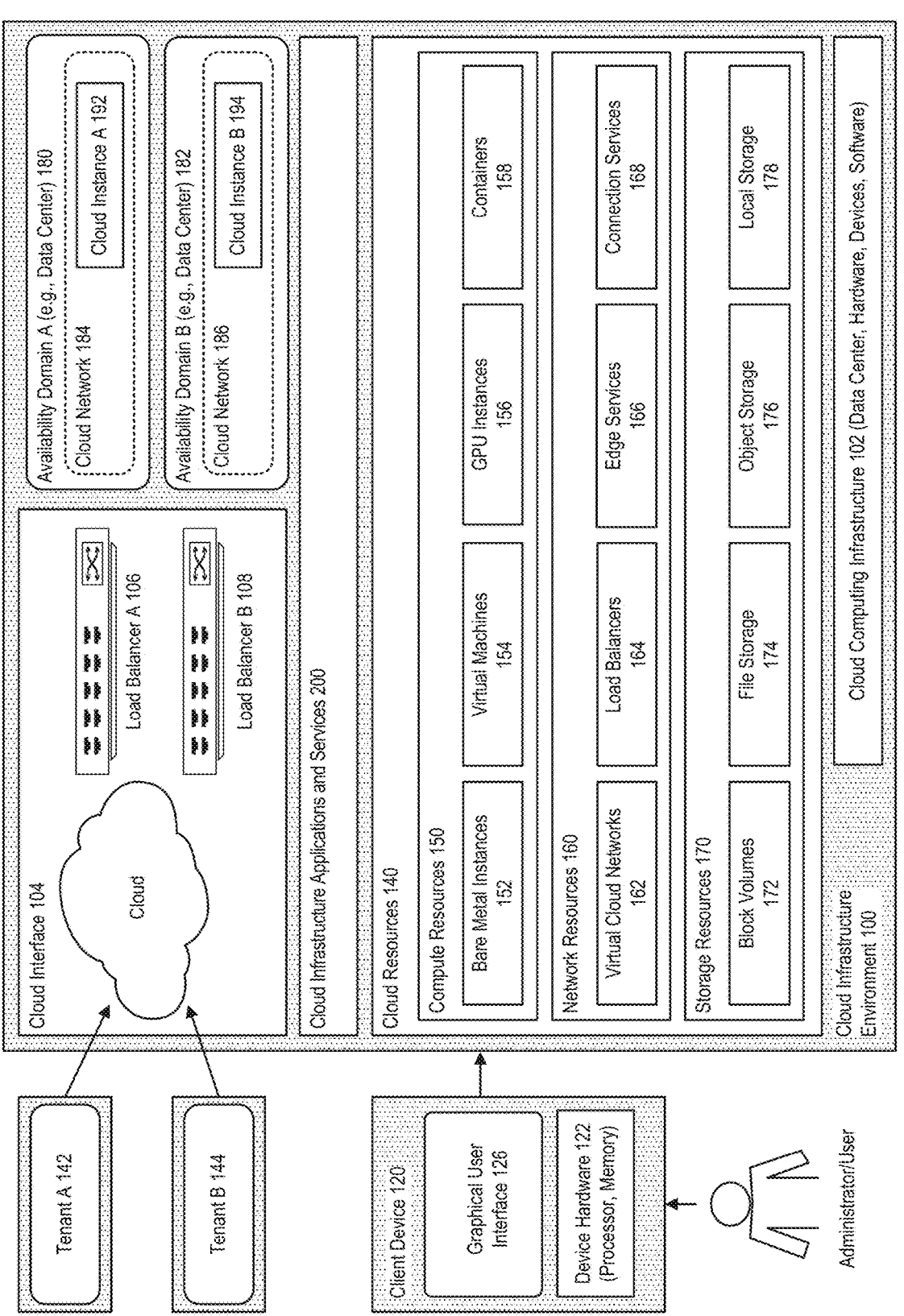
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. CONSENT-DRIVEN ACCESS MANAGEMENT ARCHITECTURE
4. CONTROLLING ACCESS TO CLOUD RESOURCES
5. EXAMPLE EMBODIMENT
6. MISCELLANEOUS; EXTENSIONS

1. General Overview

One or more embodiments use a combination of consent workflows and access policies to manage access to resources in a cloud environment. A consent workflow specifies one or more users whose approval is required to obtain access to the resources. An actor seeking access to the resources is further required to satisfy one or more access policies separate from the consent workflow.

Specifically, one or more embodiments receive a request for consent for an actor to access the resources and identifies a corresponding consent workflow. The consent workflow specifies at least one of a name or an attribute of a set of one or more users from which to obtain respective approvals of the consent request. The system traverses the consent workflow to obtain the respective approvals from the set of one or more users. One or more embodiments further determine that one or more access policies, separate from the consent workflow, permit the actor to access the target set of resources. Accordingly, the access by the actor to the target set of resources is conditioned on both (a) obtaining the respective approvals from the set of one or more users and (b) determining that the one or more access policies, separate from the consent workflow, permit the actor to access the target set of resources.

One or more embodiments generate a consent token indicating that consent has been appropriately granted for the actor to access the target resources. One or more embodiments grant the consent token responsive to obtaining the respective approvals. The granting or denying of a request to access the set of one or more resources is conditioned, at least in part, on presence of the consent token.

One or more embodiments described in this Specification and/or recited in the claims may not be included in this General Overview section.

2. Example Cloud Environments

One or more embodiments provide features associated with cloud environments, including dedicated or private label cloud (PLC) environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premises data center, software application framework, or other information technology infrastructure.

Cloud Infrastructure Environments

Figure 2:
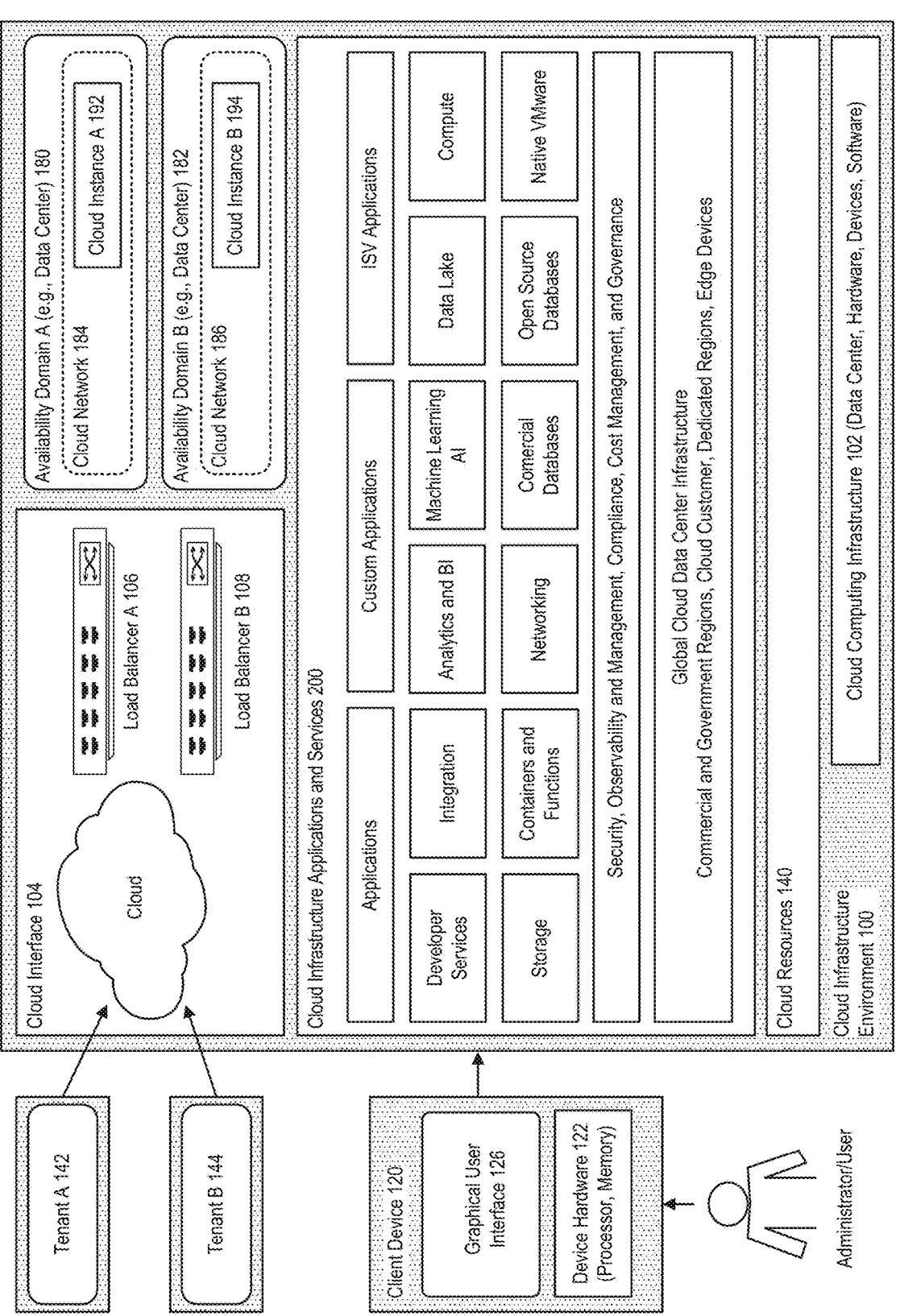
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a consent workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
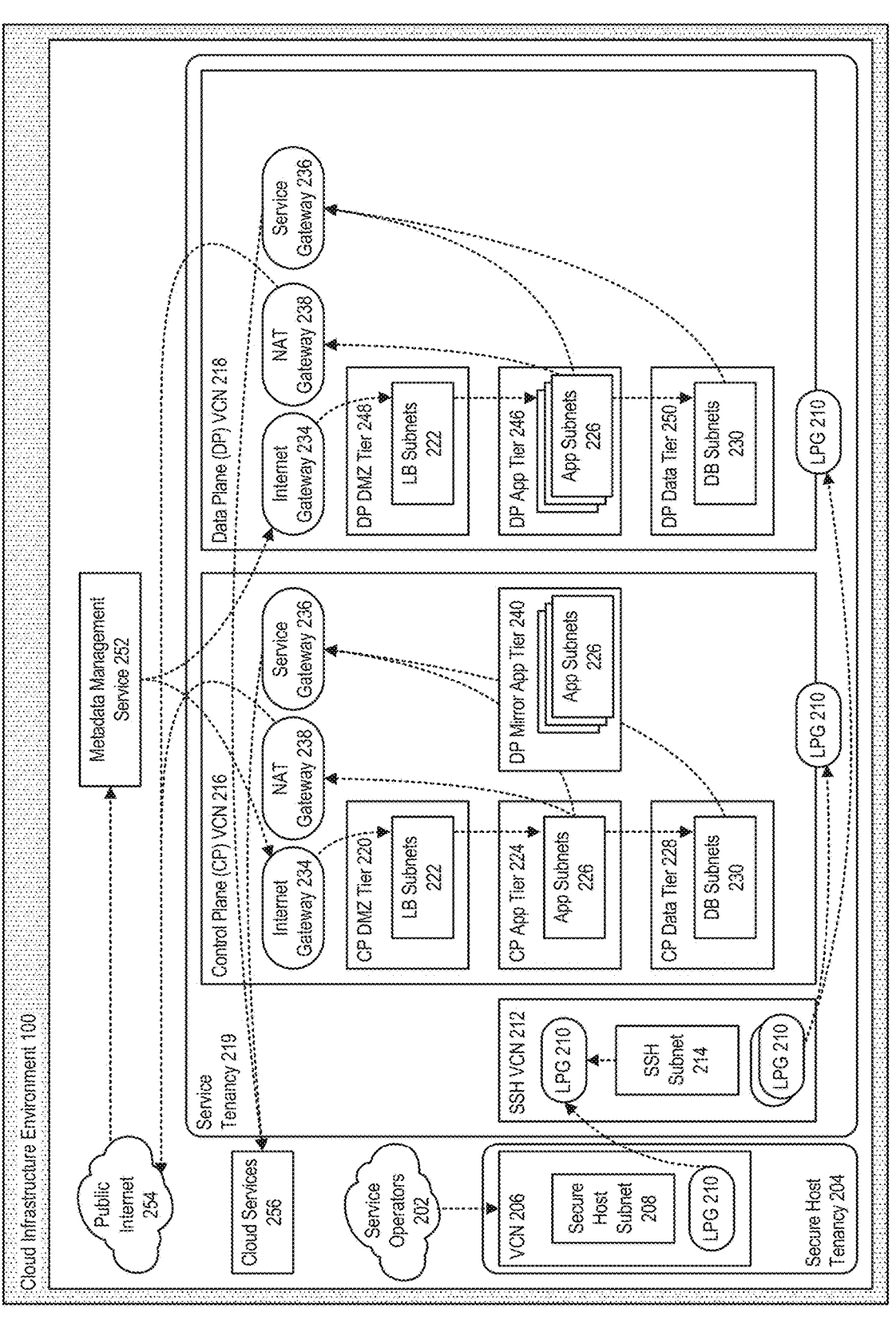
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
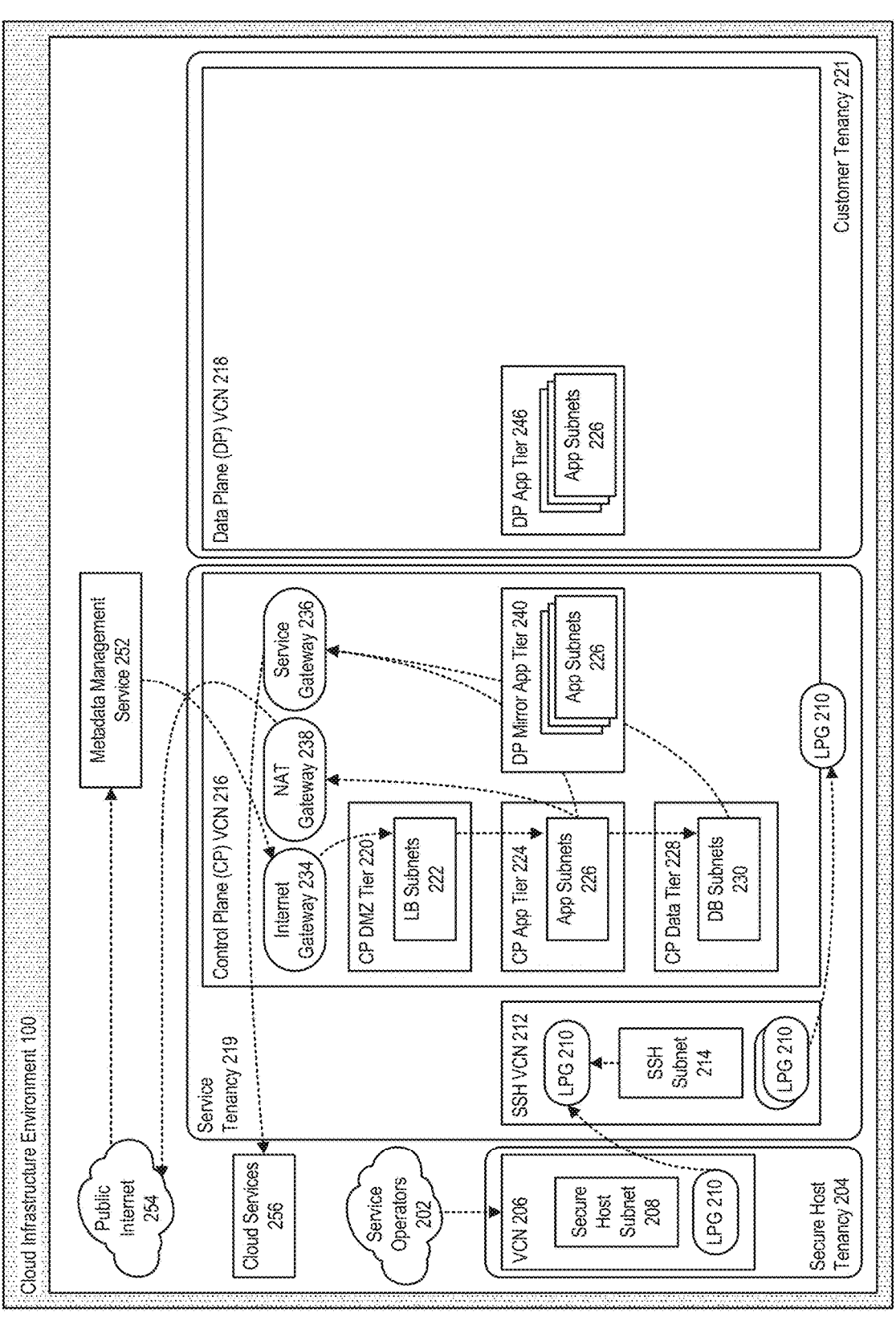
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
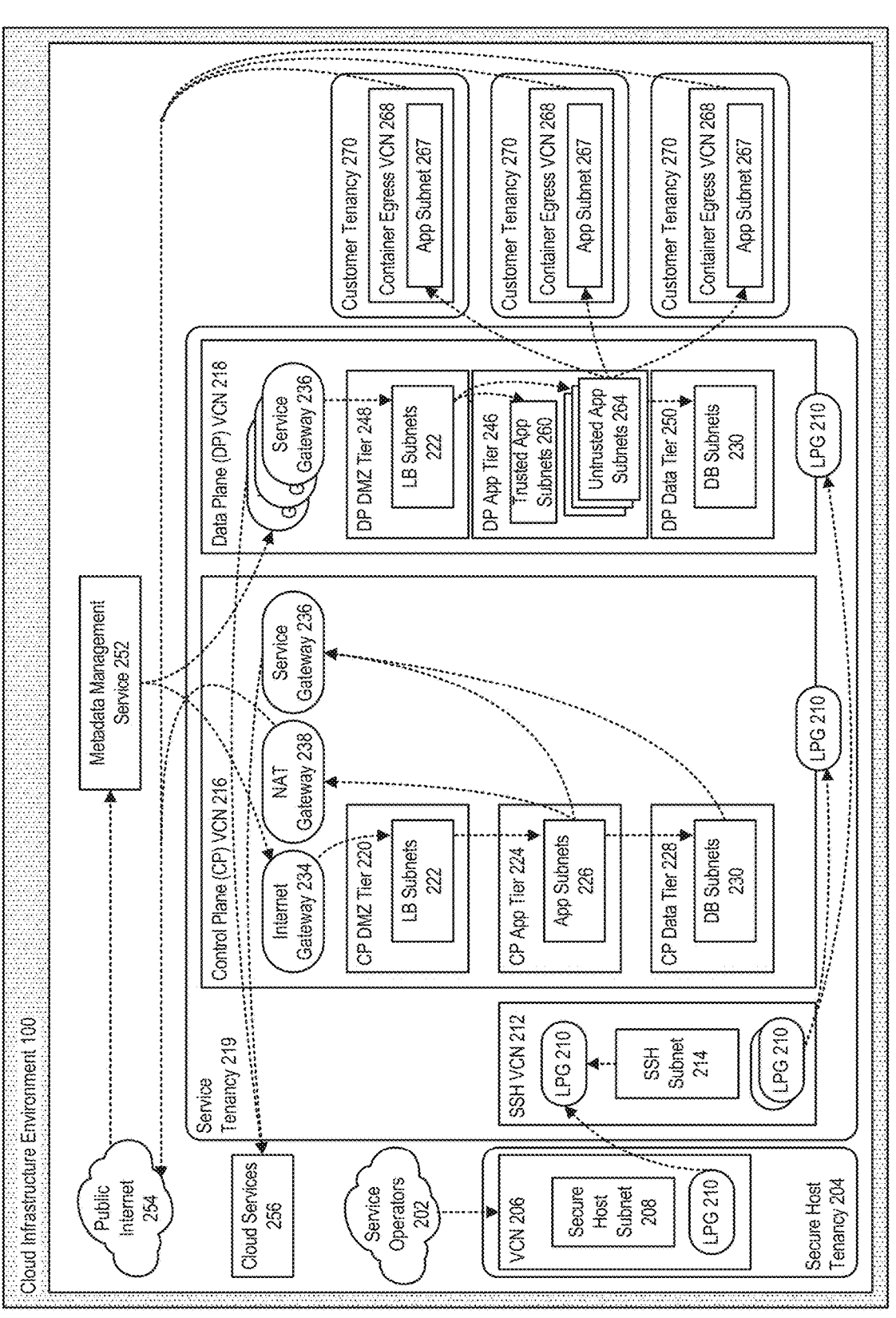
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
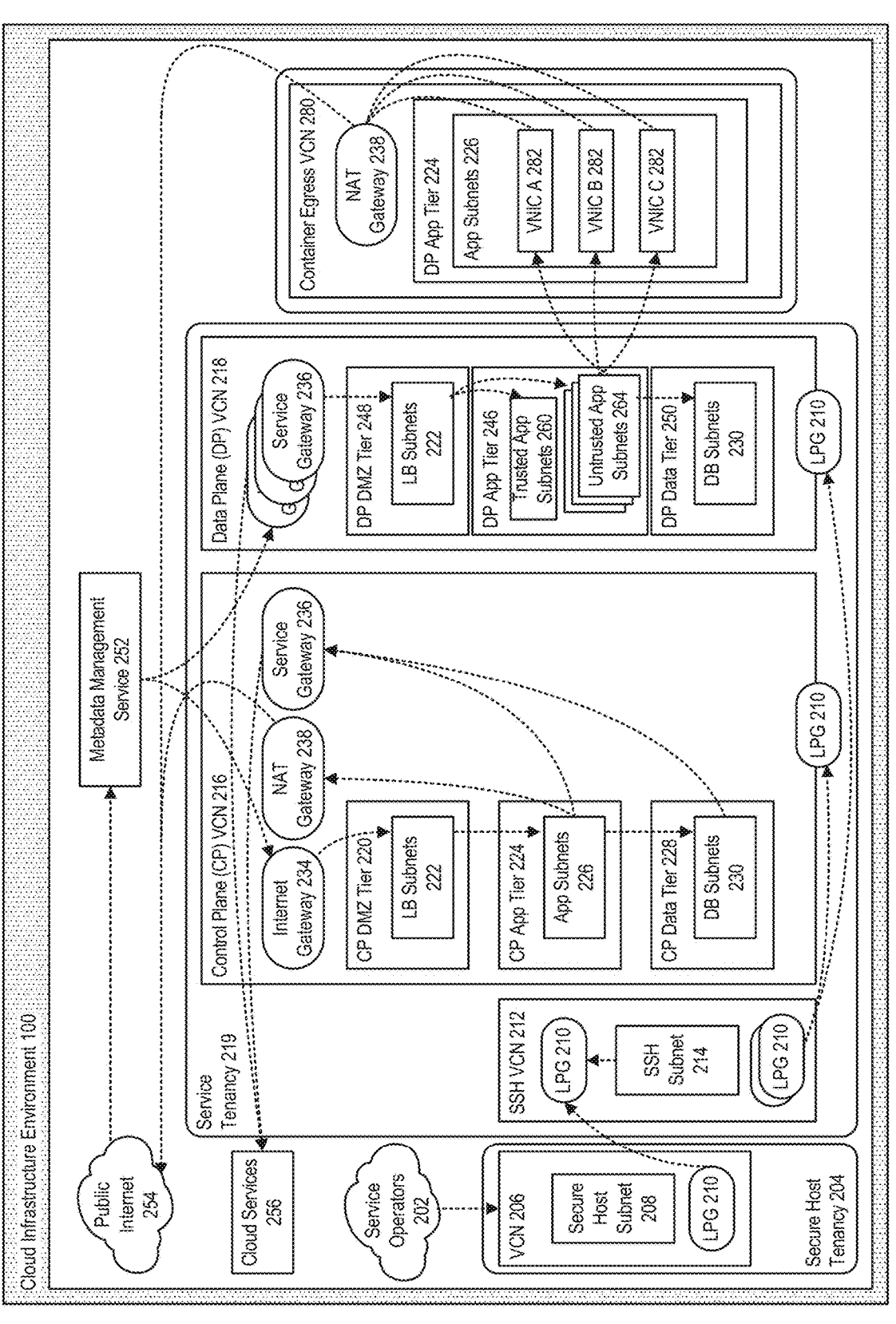
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
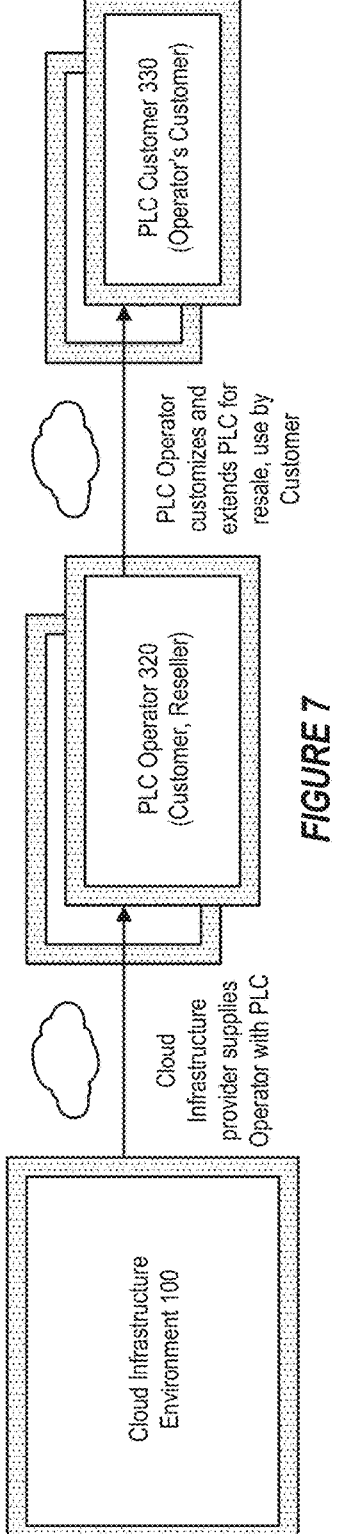
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
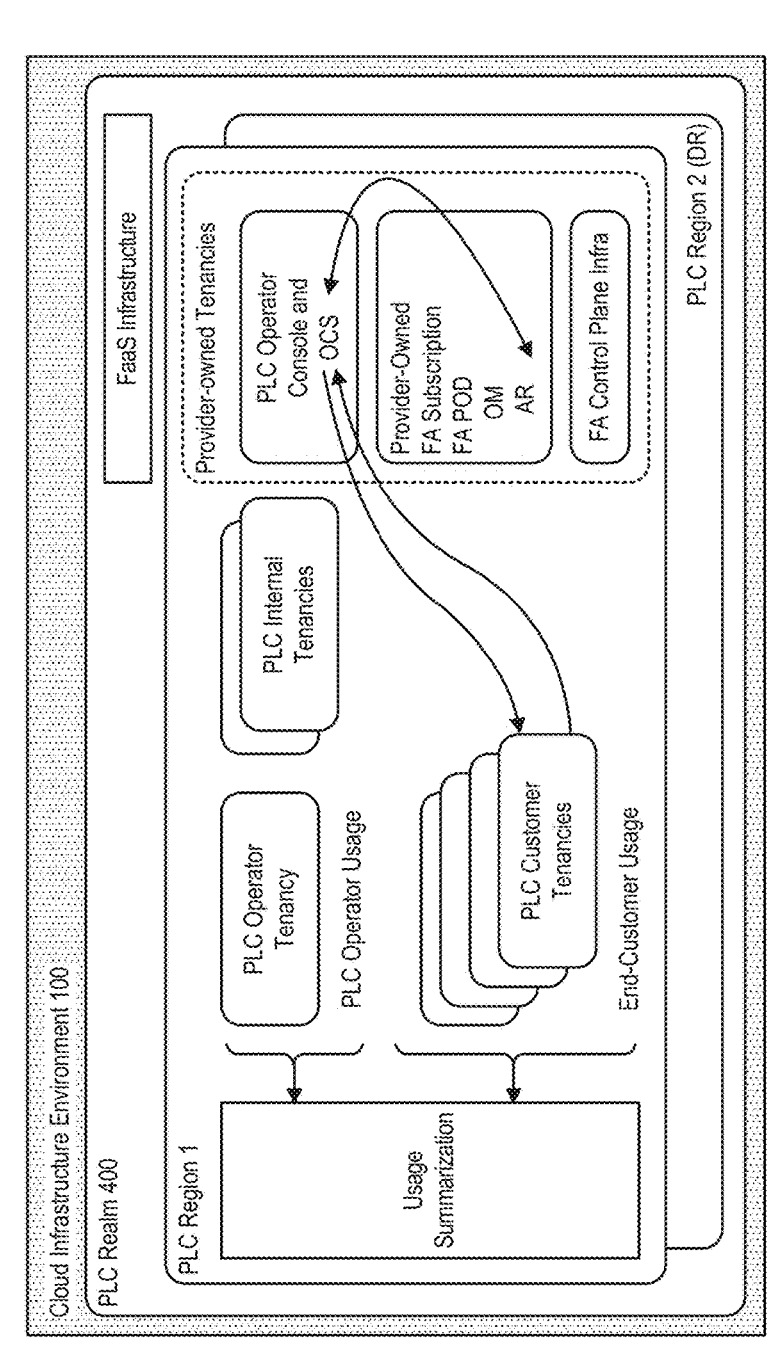
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
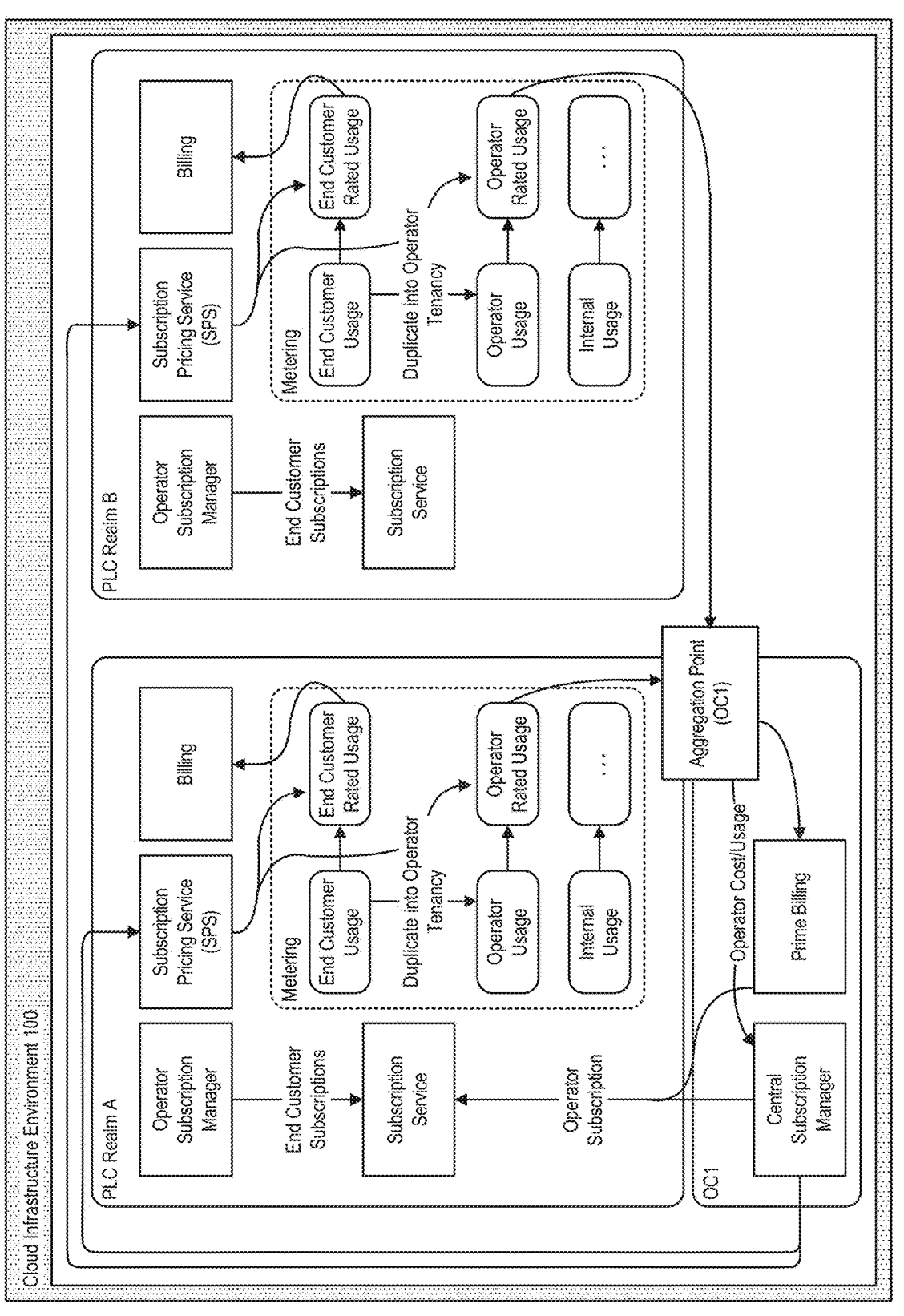
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
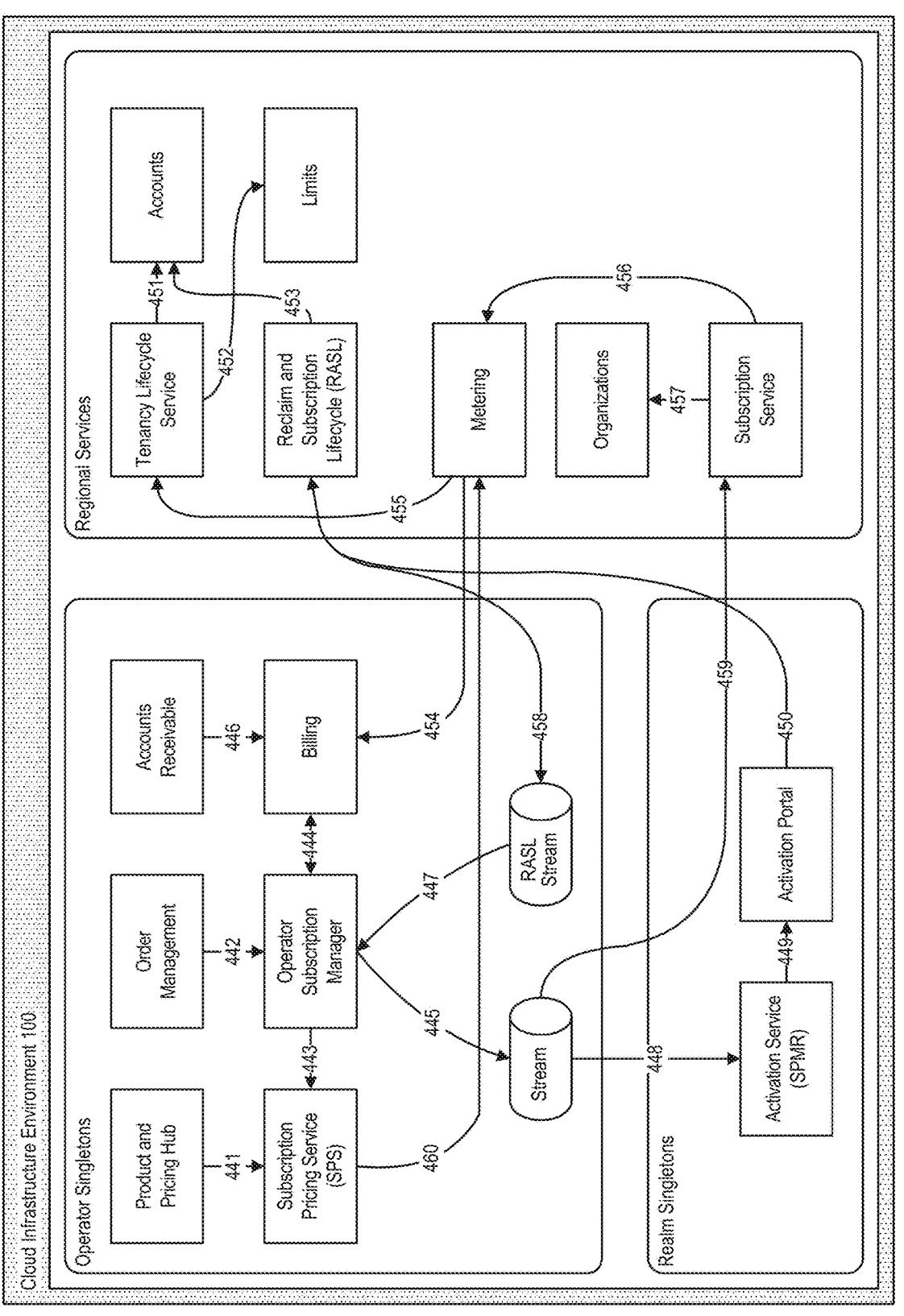
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to an cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud sub-scription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

2. Consent-Driven Access Management Architecture

As noted above, one or more embodiments use a combination of consent workflows and access policies to manage access to resources in a cloud environment. A workflow specifies one or more users whose approval is required to obtain access to the resources. An actor seeking access to the resources is further required to satisfy one or more access policies that are separate from the consent workflow.

In general, a consent workflow determines whether to grant an actor consent to access to a target set of resources. To support a consent workflow, one or more embodiments include a consent service configured to communicate with an identity service. In an embodiment, the actor is a CSP operator, i.e., a user acting on behalf of the CSP to perform one or more administrative actions. The user(s) whose consent is required may be operators associated with a CSP customer or tenant. Thus, the consent workflow gives the CSP customer some degree of control over CSP operators' access to resources in the CSP customer's cloud partition(s). For ease of discussion, the term "actor-operator" is used herein to refer to both the actor seeking consent and the operator submitting a consent request on behalf of the actor (i.e., a requestor). The actor and the requestor may be the same user. Alternatively, the actor and the requestor may be different users. The term "tenant-operator" is used herein to refer to one or more users acting on behalf of the CSP customer or tenant. For example, the tenant-operator may include one or more users who select and/or configure a consent workflow applicable to a set of resources, and/or who are responsible for granting consent in response to a consent request.

In an embodiment, the target set of resources includes one or more resources in a particular cloud partition. By "resource," the following description is referring to a service or application or even data in the particular cloud partition. For ease of discussion, in the following description, the cloud partitions are realms. Alternatively or additionally, a cloud partition may be a region, tenancy, or other logical subdivision of a cloud environment.

One or more embodiments support a consent workflow by way of additional control layer and data layer components. For an actor-operator to perform an action in a given realm, the tenant-operator must grant and the CSP actor-operator must obtain the prerequisite consent. Actions that require consent may include, for example: reading service logs, reading metric information, ongoing monitoring of PLC realm health, and connecting to the production hosts. The tenant-operator sets forth directions on handling incoming requests, for instance, by allowing certain actions only upon approval by a designated granter.

Figure 11:
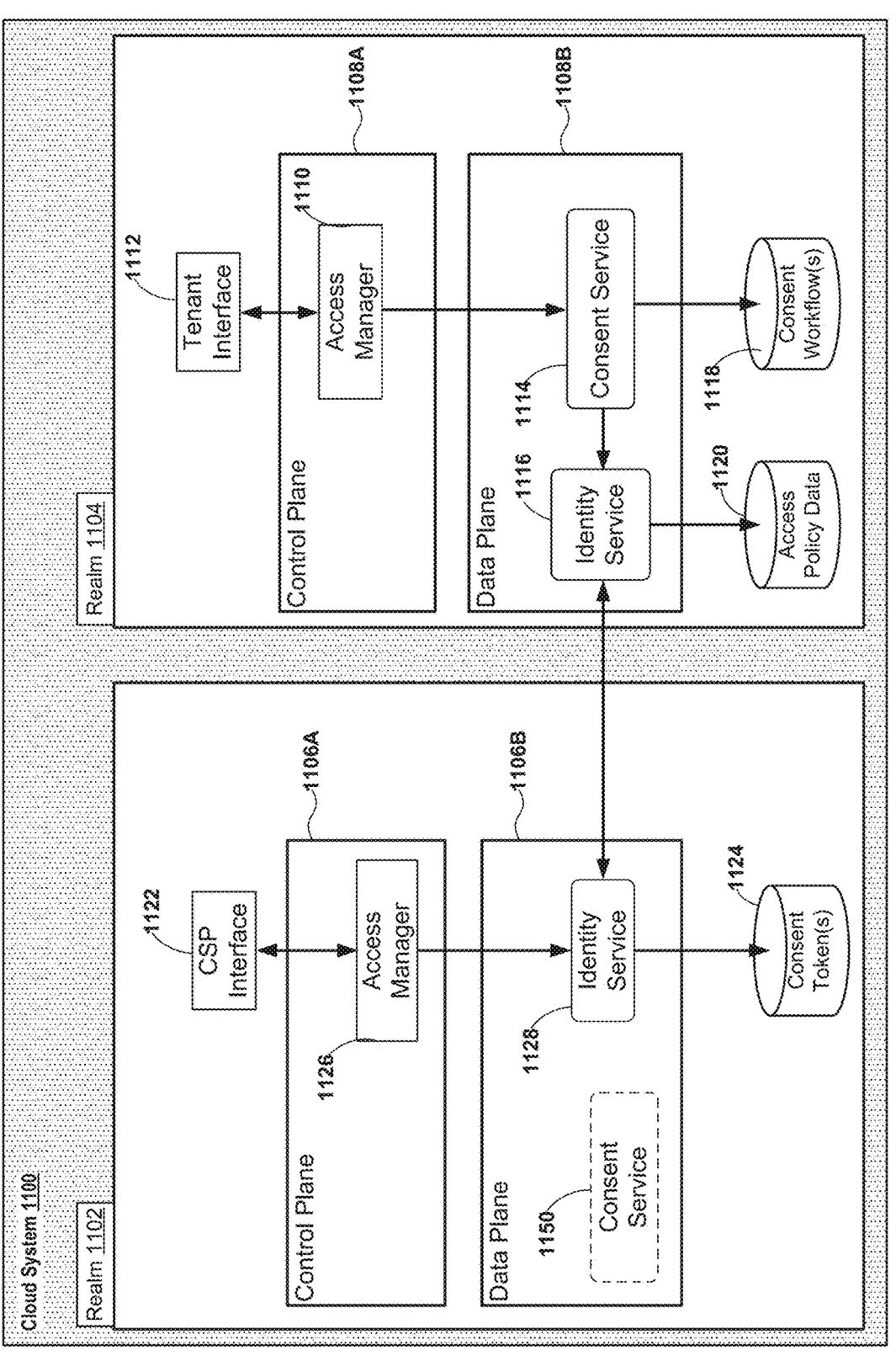
FIG. 11 illustrates a system for consent-driven access management in a cloud partition of a cloud environment.

FIG. 11 illustrates a cloud system 1100 (also referred to below simply as the "system") in accordance with one or more embodiments. As illustrated in FIG. 11, the system 1100 includes realm 1102 and realm 1104. Realm 1102 includes a CSP interface 1122, control plane 1106A, data plane 1106B, access manager 1126, consent service 1150, identity service 1128, and a data repository configured to store one or more consent tokens 1124. Realm 110 includes a tenant interface 1112, control plane 1108A, data plane 1108B, access manager 1110, consent service 1114, identity service 1116, and one or more data repositories configured to store one or more consent workflows 1118 and access policy data 1120. Each of these components is described in further detail herein.

In an embodiment, the system 1100 may include more or fewer components than the components illustrated in FIG. 11 The components illustrated in FIG. 11 may be local to or remote from each other. The components illustrated in FIG. 11 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

The system 1100 may include additional realms that are not depicted in FIG. 11. Each realm may encompass one or more data centers across geographically distinct regions. Some or all of those geographic regions may form a logical grouping, or partition, within a cloud environment.

Realm 1102 and realm 1104 each represent a cloud partition of the (same) cloud environment being hosted by the system 1100. As further illustrated in FIG. 11, both realm 1102 and realm 1104 include various components of a consent-driven access management architecture.

One or more embodiments configure realm 1102 as a cloud partition for a first entity (e.g., the CSP) and realm 1104 as a cloud partition for a second entity (e.g., a tenant and customer of the CSP). A third entity (e.g., a tenant and customer of the second entity) may be allocated another realm (not illustrated) in the system 1100. Alternatively or additionally, the second entity may resell access to realm 1104 to the third entity. For example, the second entity may allocate one or more tenancies within realm 1104 for respective third-party customers (i.e., entities that are customers of the CSP customer but not customers of the CSP itself). In one embodiment, the first entity bills the second entity for use of the cloud environment and the second entity bills a third entity for use of the cloud environment.

In an embodiment, realm 1102 and realm 1104 execute services and/or applications in a software-defined networking (SDN) paradigm. A control plane (e.g., control plane 1106A in realm 1102 or control plane 1108A in realm 1104) and a data plane (e.g., data plane 1106B in realm 1102 or data plane 1108B in realm 1104) expose interfaces (e.g., APIs) to those services and/or applications. A service or an application running in realm 1102 can use APIs of control plane 1106A and/or data plane 1106B to access another service or application running in control plane 1108A and/or data plane 1108B in realm 1104, and vice versa. In a cloud partition such as realm 1102 or realm 1104, the managing entity configures a home region with data plane services (e.g., identity data plane services) and control plane services that are global, i.e., available across other regions of the cloud environment. Each of the control plane/data plane pairs 1106 and 1108 may reside in the home region of their respective realms where the target set of cloud resources also resides. Changes to the home region of either realm will be automatically propagated to all regions.

In an embodiment, an access manager 1110 is configured to present information in a tenant interface 1112. The access manager 1110 may, via the tenant interface 1112, expose an API through which an operator and a consent service 1114 can manage (e.g. grant/deny) consent requests for consent for an actor to access a target set of cloud resources in the realm 1104. It should be noted that consent only grants the actor access; at the time consent is granted, no specific action has been attempted. One or more embodiments of the access manager 1110 and/or the consent service 1114 invoke an identity service 1116 to determine whether a certain actor of the realm 1102 is authorized to access the target set of resources.

The consent service 1114 may store, in the data plane 1108, data specifying which target set of resources corresponds to each consent request and monitor the consented actions being performed in the realm 1104. One embodiment of an example consent request includes one or more search attributes that map to a target set of resources in the cloud environment. A requestor submits the example consent request via the CSP interface 1222. The requestor is authorized to obtain consent for an actor to access the target set of resources in the cloud environment, in a situation where the example consent request would otherwise be denied, if one or more override conditions is satisfied. The requestor may be referred to as a user principal such as user principal 1402 depicted in FIG. 14.

The consent service 1114 may rely on consent workflow(s) 1118 for determining whether to grant or deny the requested consent for the actor. The consent service 1114 may be configured to execute each instruction of an example consent workflow 1118 when approving/denying a consent request. The example consent workflow 1118 may be configured to allow the actor to access a target set of resources only upon approval by a designated granter. The example consent workflow 1118 evaluates a condition that is based on state data at a time of the consent request. In another example consent workflow 1118, consent has been pre-approved and additional approvals are not needed.

The identity service 1116 can apply access policy data 1120 to a user identity of the actor; upon confirming authenticity of the actor's user identity, the identity service 1116 may determine whether to permit connectivity to the target set of resources for the actor. The identity service 1116 may operate in concert with the consent service 1114 under the consent-driven access management architecture of the system 1100.

The actor may be an operator for the CSP and in some examples, also a requestor of consent for access to the target set of resources. In turn, one or more operators for a tenant of the CSP may approve the consent request for consent. When the consent request for consent is approved, the actor may submit, via a CSP interface 1122, a request to access the target set of resources and perform an action. Responsive to obtaining approval(s) for the consent request for consent, the consent service 1114 may return a credential that represents the consent, referred to herein as a consent token 1124. It should be noted that the consent service 1114 is not limited to granting consent token(s) 1124 and can grant alternative credentials in other embodiments.

The above-mentioned actor for the CSP may initiate a principal session to access the target set of resources and perform an action on the target set of resources. The access manager 1126 may submit the consent token 1124 to identity service 1128 for activation and/or authentication. Once activated and/or authenticated, the access manager 1126 embeds the consent token 1124 in a session request submission. When received by the target resource, the session request causes configuration and commencement of the principal session.

Similar to realm 1104, realm 1102 may include a consent service 1150. The consent service 1150, in a manner similar to the consent service 1114, may receive a consent request and proceed to either approve or deny the request for consent. Alternatively or additionally, consent service 1114 and/or consent service 1150 may be configured to support a "break-glass" feature of the consent-driven access management architecture, as described in further detail herein.

The access manager 1110 may run some functionality of the consent service 1114 in the control plane 1108A of the realm 1104, according to its SDN-type architecture. Specifically, the access manager 1110 may include a representational state transfer (REST) API endpoint for receiving/ transmitting consent requests and consent request responses between the tenant interface 1112 and the data plane 1108B. The same REST API endpoint may be invoked to update the consent workflow(s) 1118 with new, expired, or modified consent workflows. The same REST API endpoint also may be invoked to configure the data plane 1108B with various data including the consent status information. In one embodiment, the consent service 1114 maintains, in the data plane 1108B, a list of actions covering any operation that requires connection to the realm 1104 (e.g., a PLC realm). The tenant-operator provides, via the tenant interface 1112, configuration information (e.g., consent status information) indicating which actions to automatically approve/deny and which actions require further attention (e.g., review and/or approval of one or more human operators). Hence, the consent service 1114 may be responsible for (one-time) configuration of the realm 1104 with static consent approvals/denials and/or consent workflows.

The access manager 1110 may store the above configuration in the data plane 1108B as the consent status information. In response to a service request, the consent service 1114 calls a data layer function (e.g., the identity data plane API) and returns a corresponding consent status to the access manager 1110 and/or the access manager 1126. The consent service 1114 may record the incoming (and approved) consent requests in the data layer and track changes to the consent status information.

In one embodiment, the system 1100 includes a break-glass mechanism for the consent service 1150, which enables a user principal to approve a consent request in case of an outage, security breach, or other severe issue. In such cases, time is of the essence; successfully remediating the issue may require prompt action that does not allow for executing a consent workflow 1118. The identity service 1128 applies consent on behalf of the CSP to authorize actions in the realm 1104 by a system engineer or a service/ application running in the realm 1102. The access manager 1126 further applies consent to approve (a) continuous actions, such as ongoing monitoring of realm health, and/or (b) time-bound actions, such as an engineer connecting to a production host or reading service logs to troubleshoot an ongoing issue.

In one or more embodiments, the tenant interface 1112 and the CSP interface 1122 refer to hardware and/or software configured to facilitate communications between an operator and realm 1102 and realm 1104, respectively. Both the tenant interface 1112 and the CSP interface 1122 render user interface elements and receive input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of either the tenant interface 1112 or the CSP interface 1122 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the tenant interface 1112 or the CSP interface 1122 is specified in one or more other languages, such as Java, C, or C++.

In one or more embodiments, a tenant is a corporation, organization, enterprise or other entity that accesses a shared computing resource, such as a service or application. In an embodiment, tenant and tenant are independent from each other. A business or operation of tenant is separate from a business or operation of tenant.

One example embodiment of the CSP interface 1122 includes an example consent page, such as a new DevOps consent page. The actor-operator can use the CSP interface 1122 to request consent to access a set of resources in the realm 1104. The actor-operator receives a notification when the consent request gets approved. In an embodiment, an approved consent token 1124 can be activated within a certain amount of time (e.g., some predefined number of minutes, hours, or days). Alternatively or additionally, an activated consent token 1124 may remain active for a certain amount of time (e.g., some predefined number of minutes, hours, or days) before a new consent approval is needed.

In an embodiment, activating the approved consent token 1124 provides the actor-operator with a consent principal session token, or "CPST" for short. The CPST can be used to make requests to perform specific actions on the resource(s). For example, if consent has been granted to a logging system, the CPST may be used to request access to perform one or more actions in the logging system, such as searching logs. Alternatively or additionally, the system 1100 may allow the actor-operator to export the CPST (e.g., to a configuration file or other storage format) for subsequent use in other locations.

In an embodiment, a data repository is any type of storage unit and/or device (e.g., a file system, database, collection of tables, and/or any other storage mechanism) for storing data. As illustrated in FIG. 11, data repositories are configured to store consent tokens 1124, access policy data 1120, and consent workflows 1118. A data repository may include multiple different storage units and/or devices. The multiple different storage units and/or devices may or may not be of the same type or located at the same physical site. A data repository may be implemented or executed on the same computing system as realm 1102 and/or realm 1104, and/or on a computing system separate from realm 1102 and/or realm 1104. A data repository may be communicatively coupled to one or more other components via a direct connection or via a network. Information describing consent tokens 1124, access policy data 1120, and consent workflows 1118 may be implemented across any of the components of the system 1100. However, this information is illustrated within data repositories for purposes of clarity and explanation.

In one or more embodiments, the system 1100 includes hardware and/or software configured to perform operations described herein for effectuating consent-driven access management. Examples of operations for consent-driven access management are described below with reference to FIG. 12.

In an embodiment, the system 1100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

4. Controlling Access to Cloud Resources

Figure 12:
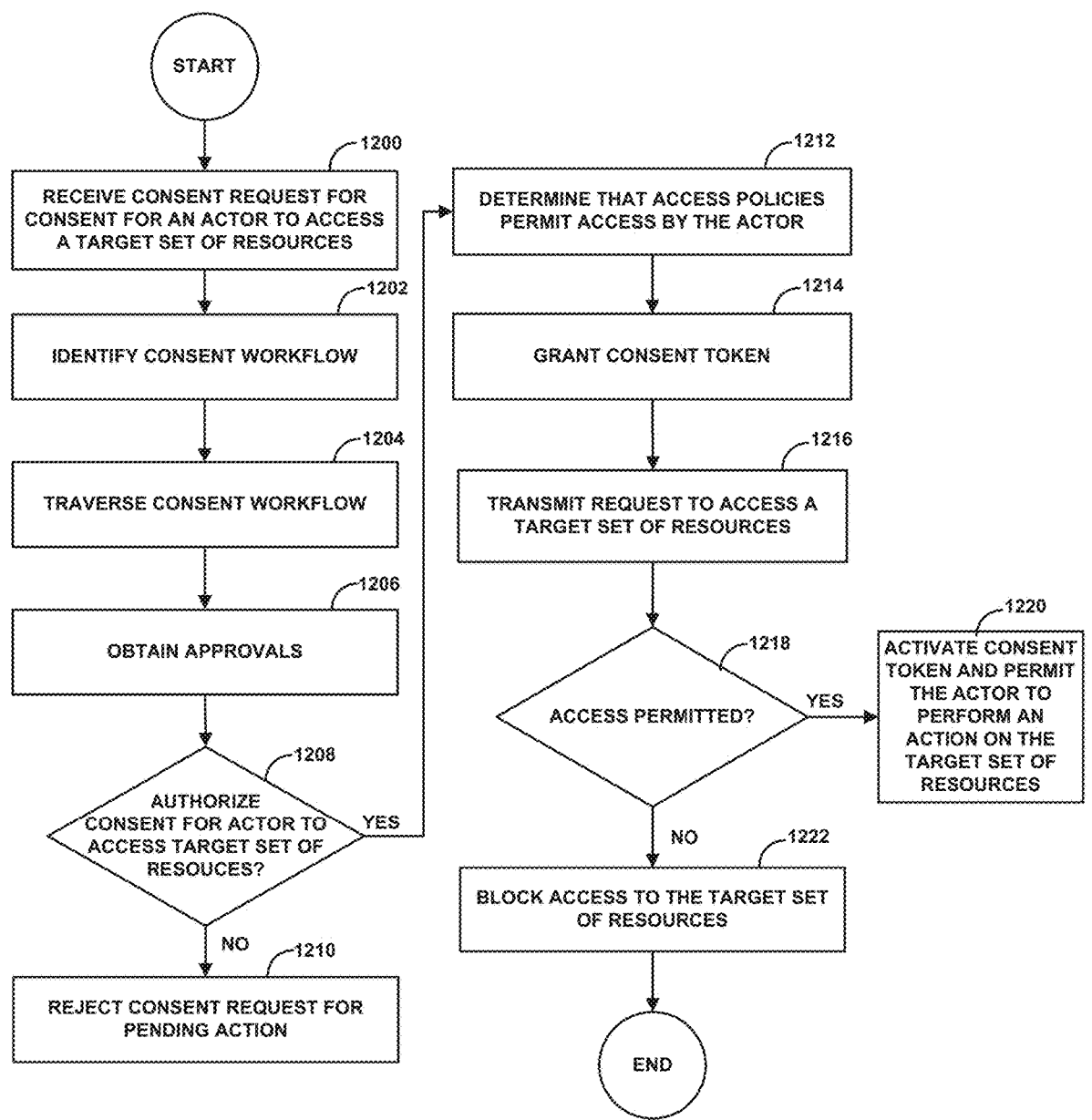
FIG. 12 illustrates an example set of operations for consent-driven access management in a cloud partition of a cloud environment in accordance with one or more embodiments.

FIG. 12 illustrates an example set of operations for consent-driven access management for cloud resources in accordance with one or more embodiments. One or more operations illustrated in FIG. 12 may be modified, rearranged, or omitted all together. Accordingly, the particular sequence of operations illustrated in FIG. 12 should not be construed as limiting the scope of one or more embodiments. A system for running at least one cloud environment performs the example set of operations according to one or more embodiments.

In an embodiment, the system receives a consent request for consent for an actor to access a target set of resources (Operation 1200). As described herein, the actor is an operator for a first entity (e.g., a CSP) having at least one cloud partition of the cloud environment, and the consent for the actor may relate to a specific action to be performed on the target set of resources. The consent request generally includes a request for consent for the actor to access the target set of resources (in a second cloud partition). The consent request may specify at least one search attribute that map to the target set of resources. The target set of resources may belong to a second entity, a tenant of the second cloud partition and one of the CSP's customers. The second entity may provide the requisite consent request approval through a number of techniques as explained below in detail.

The actor-operator for the first entity may submit the consent request through a console (e.g., a CSP console), and a tenant-operator for the second entity may view the consent request as an incoming message on their own console (e.g., a tenant console). The console may communicate the consent request by invoking a REST API in the first cloud partition to transmit the consent request to the tenant console, a REST API endpoint in the second cloud partition. The tenant-operator may then use the tenant console to check pending consent requests for any conflict with an approved consent request or violation of a consent workflow.

One embodiment includes a consent service that, on behalf of the second entity, either approves or denies the actor's consent request for consent to access the target set of resources. In general, the target set of resources refers to one or more services or applications having functionality (e.g., a service API) for performing various actions and may include, for example: a log search service, a matrix search service, a host connectivity service, and so forth. The consent service may receive the consent request in the second cloud partition of the cloud environment. The consent service may be further configured to respond to the consent request by granting or rejecting the requested consent. The consent service may provide the actor with a consent token representative of the granting of the requested consent. Otherwise, the actor may not be permitted to access the target set of resources and therefore cannot perform any action with any of the target set of resources. Actions subject to approval and consent may include, for example: reading service logs; reading metric information; ongoing monitoring of realm health; and connecting to the production hosts.

Alternatively, the second entity may operate as a CSP that provides cloud services to a third entity, a tenant of a third cloud partition and a customer of the second entity's CSP. In one embodiment, the second entity submits the same or similar consent request on behalf of one of its actors or, as an alternative, an actor of another entity (e.g., the first entity). The third entity controls, at least in part, access to the third cloud partition but, in response to receiving the consent request, may grant the requested consent to the actor for the second entity. The second entity may direct the consent request to the third entity's consent service, which evaluates the consent request and either approves or denies the actor's request for consent to access the target set of resources. Thus, an actor performing the consented action may belong to the same or different entity from a requestor requesting consent for the actor to access the target set of resources.

In an embodiment, the system identifies a consent workflow associated with the consent request (Operation 1202). In one embodiment, the consent request includes one or more search attributes that map to a target set of resources in a cloud environment (or specifically, in a cloud partition of the cloud environment). The tenant-operator can establish the consent workflow for handling an incoming consent request (for consent) for an actor to access the target set of resources. In general, the consent workflow comprises instructions indicating from whom approval of consent can be obtained and for whom consent can be granted. In an embodiment, the consent workflow specifies a name or an attribute of a set of one or more users from which to obtain respective approvals of the consent request. In another embodiment, the consent workflow specifies an attribute identifying an action to be performed on the target set of resources.

In an embodiment, the system traverses the consent workflow (Operation 1204). The system can either reject or accept the consent request based on the associated consent workflow. One or more embodiments of the consent service traverses the consent workflow by implementing the associated consent workflow and executing its instructions until completion. Before the consent service can grant consent in response to receiving the incoming consent request, certain requirements outlined in the consent workflow must be met; otherwise the grant of consent would run counter to the tenant-operator's prescribed instructions. Consent, therefore, is conditioned on the satisfaction of the consent workflow.

In an embodiment, the system obtains approvals from one or more operators of the second cloud partition (Operation 1206). The consent workflow may define a list of operators from whom a particular number of approvals is to be obtained. An example consent workflow may allow the actor to access the target set of resources only upon approval by a designated granter. Another example workflow may auto-approve the specific action, for instance, if consent has already been given.

In an embodiment, the system determines whether to authorize consent for the actor to access the target set of resources (Operation 1208). Based on the example consent workflow and the obtained approvals, the system can confirm satisfaction of that consent workflow. By doing so, the system can enforce consent before allowing any action in a cloud partition (e.g., a tenant or PLC realm) by any principal. In one embodiment, the system can confirm satisfaction of the consent workflow where such satisfaction is conditioned on state data of the cloud environment. If sufficient approvals are obtained, the consent service is configured to grant a credential permitting the actor to request access to the target set of resources for performing the consented action.

In an embodiment, if the system determines to not authorize consent (NO), the system rejects the consent request (Operation 1210). The consent service for the second entity of the second cloud partition may return, to the first cloud partition, a message indicating the rejection of the consent request.

If the system determines to authorize the consent (YES), the system proceeds to determine that access policies permit access by the actor (Operation 1212). The consent service may invoke an identity service to determine satisfaction of any access policies for the target set of resources.

Both the first entity and the second entity manage respective identity services to evaluate access policies, which are separate from the consent workflow and configured to govern which actors are permitted to access the target set of resources. In one embodiment, the first entity also manages their own (independent) consent service, for example, to effectuate a break-glass scenario when the tenant's consent service cannot be accessed nor instructed. The first entity also manages a centralized service that onboards the target set of resources and allows the actor-operator to perform a consented action. The actor-operator of the second entity may use their consent service to retrieve consent status. The consent status information may be retrieved and dynamically evaluated for one or more purposes, such as when determining whether to validate the consent token and/or the consented action.

In an embodiment, the system grants a consent token to the actor (Operation 1214). One example embodiment of the credential described above is a consent token that is granted by the consent service of the second entity and the second cloud partition. The system can configure the consent token by setting a first time period during which a consent token is valid and can be activated for a second time period. During the second time period is when the actor is permitted to access the target set of resources (i.e. while the consent token is valid and activated).

In an embodiment, the system can further configure the consent service to grant the consent token by traversing an appropriate type of consent workflow. Different types of consent workflows can be used by the consent service, depending on the cloud environment. For example, if the appropriate consent workflow corresponds to a standing consent workflow type, the consent request may be pre-approved by a set of one or more users (e.g., tenant-operators). For an example consent workflow that corresponds with on-demand consent, obtaining the respective approvals from the set of one or more users requires user input from the one or more users responsive to the consent request. Another example consent workflow type corresponds to quorum consent, which is when obtaining the respective approvals from the set of one or more users requires approval of at least a minimum number of the set of one or more users.

In an embodiment, the system transmits a request to access a target set of resources to another service (Operation 1216). The request may include a valid consent token granted by the consent service. The system transmits the request to a service or application that is configured to evaluate access policies and either grant or deny the request to access the target set of one or more resources. The second cloud partition manages its own identity service and consent service in order to authorize consent tokens and return any consent token blobs responsive to verifying the access policies based on the token. The consent service can integrate with an identity service to retrieve an associated consent token blob. The consent token blob may be signed by the identity service.

In an embodiment, the system determines whether access is permitted to the target set of resources (Operation 1218). The consent service may invoke an identity service to determine satisfaction of any applicable access policy for the target set of resources. The identity service may proceed to monitor the usage of the consent token in the realm 1104. One embodiment of the identity service evaluates the consent token blob to verify a scope of consent associated with the consent token. The consent service may be further adapted to operate the second cloud partition without supporting any host connectivity (e.g., from the first cloud partition).

One embodiment of the consent service in the second cloud partition transmits the consent token to an identity service in the first cloud partition. The actor-operator of the first cloud partition can, via the identity service, submit a service call to activate the consent token (using the above consent token blob) and receive a consent principal session token to start performing consented actions. As a result, the identity service can automatically permit access to the target set of resources based on the activated consent token.

After satisfying both consent workflow and access policies for target set of another entity's resources, any consented action is permitted by providing the consent token in a service request (e.g., a service call directed to an in-realm service or in-region service). The service may be included as one of the above-mentioned target set of resources specified by the consent request. The actor-operator, via the console interface, can engage in a session with the service by submitting service requests and receiving service request results.

In one embodiment, a centralized service (herein referred to as an access manager) can on-board the in-realm/in-region service. During the session with the actor-operator, the centralized service is operative to submit a service request (e.g., in the form of a function call of a service API) causing the on-boarded service to execute the consented action.

If the system determines to permit access (YES), the system proceeds to activate the consent token and permit the actor to perform an action on the target set of resources (Operation 1220). The identity service for either the first entity or the second entity may determine that the consent token within its validation period but not yet activated for use and therefore, access to the target set of resources should be permitted.

In an embodiment, if the system determines not to permit access (NO), the system blocks access to the target set of resources (Operation 1222). The identity service for either the first entity or the second entity may determine that the consent token is invalid or past its activation period and therefore, access to the target set of resources should not be permitted.

In the event of an emergency, the actor-operator has access to a service (e.g., a consent service) with an override ("break-glass") feature according to one or more embodiments. As such, the service may be an alternative consent service when compared to the consent service in the second cloud partition. The override feature allows the consent service to override a previous rejection of a consent request under certain circumstances.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 13A:
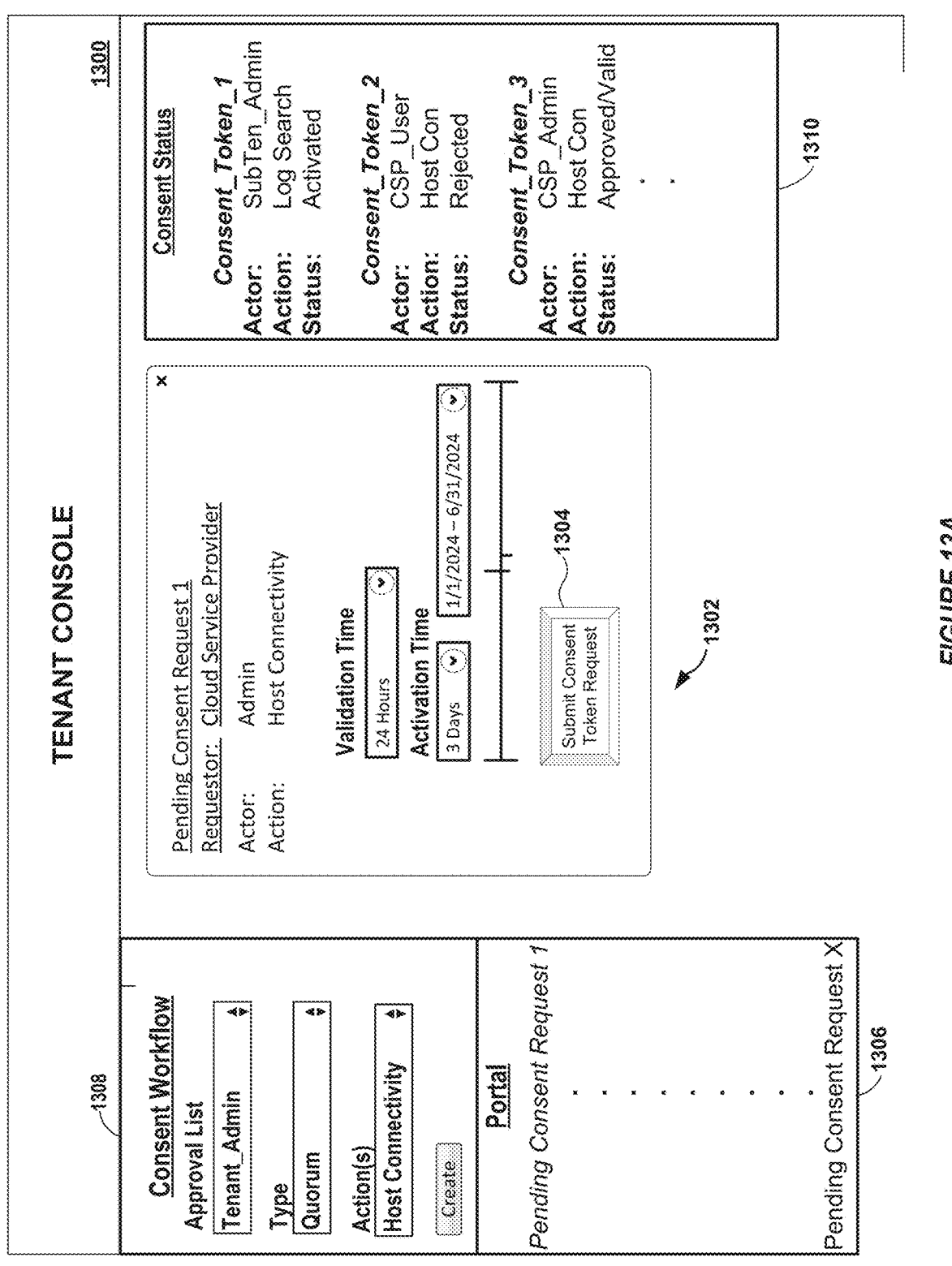
FIGS. 13A-13B each illustrate an example graphical user interface (GUI) for managing consent requests between a first entity and a second entity of a cloud environment in accordance with one or more embodiments.

FIG. 13A specifically illustrates an example GUI for use by an entity, for example, to provide consent for an actor to access a target set of resources in a cloud environment including a cloud partition managed. The example GUI can be used by the entity for granting/denying a consent request from a different entity. The example GUI, which is depicted in FIG. 13A as tenant console 1300, represents an example of a tenant interface (e.g., the tenant interface 1112 of FIG. 11) to a cloud partition of a cloud environment. The tenant console 1300 renders user interface (UI) elements as GUI controls to present various information and receive input including commands for changing the presented information. For the tenant console 1300, an application or service (e.g., a control plane application or service) may support the rendering of the UI elements and the functionality of any controls. Any input received via the tenant console 1300 is processed by the application or service.

One embodiment of the tenant console 1300 notifies the tenant-operator of pending consent requests as illustrated by example pending consent request 1302. The above application or service may provide the example pending consent request 1302 to the tenant console 1300 for presentation as a combination message box and form controls. The message box indicates various attributes of the consent request, including an actor attribute (e.g., an operator identifier or user_id), an action attribute, and so forth. The application form includes various settings for configuring a corresponding consent token request. The attributes must satisfy at least one criterion before approving a consent token request and subsequent generation of a consent token. Once satisfaction is confirmed, the various settings determine how to configure functionality of the consent token.

In FIG. 13A, the application form of the example pending consent request 1302 includes button 1304 that, when activated, instructs the application or service to submit at least the inputted form data to a consent service (or another identity data plane service). An example submission may be a service call with the above attributes and settings input as function call parameters. Once a corresponding consent token request is submitted, the tenant console 1300 removes the example pending consent request 1302.

One embodiment of the tenant console 1300 presents a list of pending consent requests in portal 1306. For any given pending consent request, once the tenant-operator approves the consent request and submits a corresponding consent token request, the tenant console 1300 removes the given pending consent request from the list or modifies the list entry to indicate an approved pending consent request. On the other hand, if the consent request is rejected, the tenant console 1300 removes the given pending consent request from the list or modifies the list entry to indicate a rejected consent request. Every incoming consent request is added to the list of the portal 1306 upon receipt. Any interaction with a list entry is operative to select a consent request for further review. Individual consent requests may be selected and presented in the same format as the example pending consent request 1302.

As described herein, consent workflows are used to evaluate consent requests in accordance with the instructions of the tenant-operator. The tenant console 1300 facilitates the definition of new consent workflows where each consent workflow generally sets forth a set of criteria for approving consent requests. The set of criteria can also be used in preparing submissions of corresponding consent token requests for the approved consent requests.

In an embodiment, the tenant console 1300 depicts control 1308 (labelled "Consent Workflow" in FIG. 13A) with drop down menus for selecting the different criterion to be programmed into an example consent workflow. That example consent workflow can be used to evaluate the example pending consent request 1302 and if approved, the tenant console 1300 enables the button 1304 to accept activation, by the tenant-operator, and transmit a corresponding consent token request.

As illustrated, the control 1308 includes an approval list menu specifying which tenant-operators have to provide an approval before consent can be granted. The control 1308 may further indicate which tenant-operators have already provided their approval. The control 1308 includes a type menu for setting a consent token type attribute, which defines a scope of any new consent token to be created upon completion of the approval list. The control 1308 may include an action menu that facilitates selection of a specific consented action attribute to encode into the new consent tokens. Before approving any new consent tokens, the same consented action attribute value must be found in the consent requests. The new consent tokens, distributed amongst tenant-operators of the CSP, inform each tenant-operator as to which consented action(s) have been approved, The tenant console 1300 further illustrates a control 1310 for presenting consent status information for any consent tokens approved/created by the tenant. The control 1310 further describes attribute information for each identified consent token.

Figure 13B:
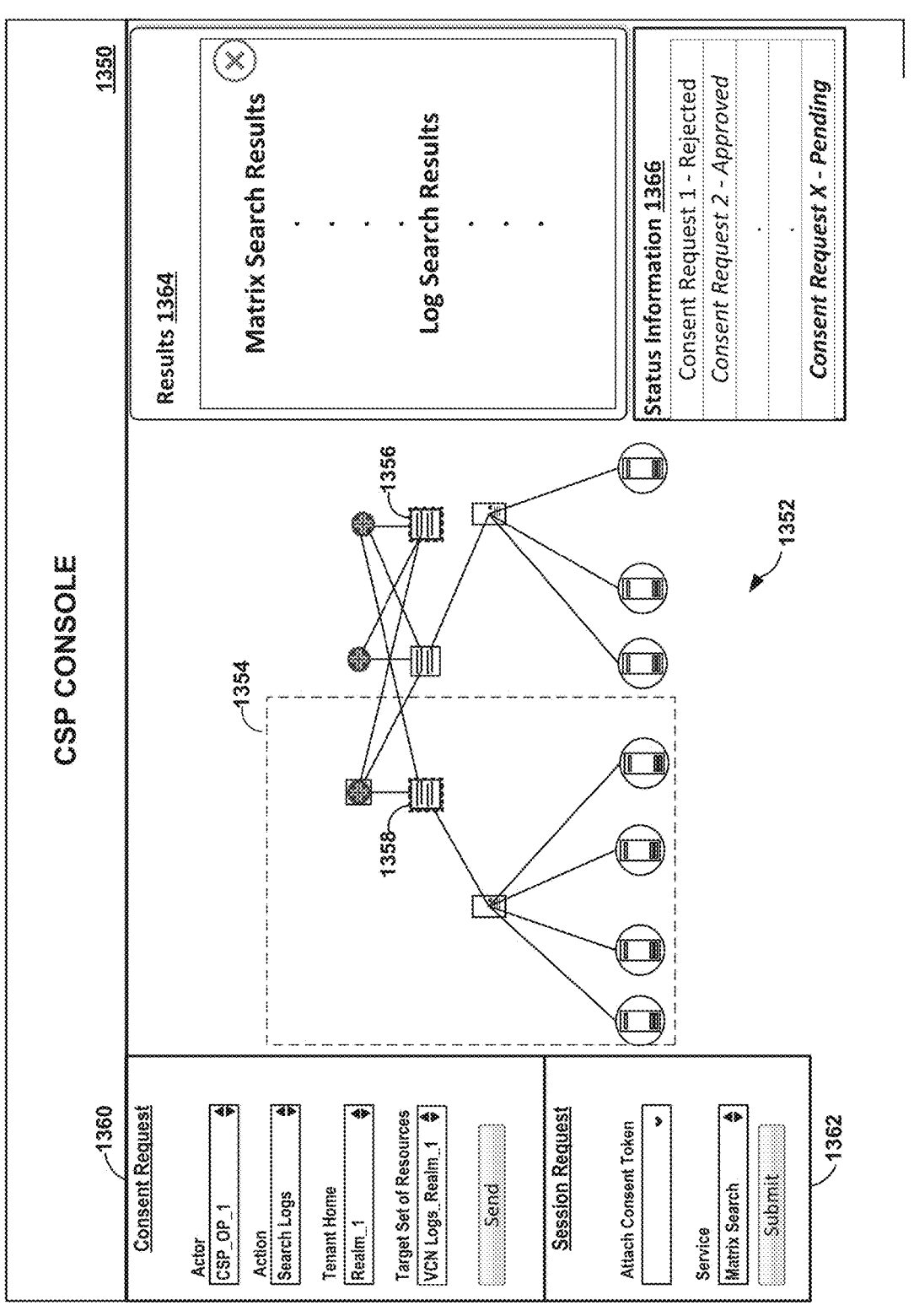

FIG. 13B specifically illustrates an example GUI for use by a first entity to request consent for an actor to access to a target set of resources in a cloud partition associated with a second entity. The example GUI further illustrates a network hierarchy for the cloud environment 1352 and a logical grouping of regions for cloud partition 1354. The example GUI, which is depicted in FIG. 13B as CSP console 1350, represents an example of a CSP interface to cloud environment 1352.

A consent service running in region 1356 (e.g., a home region in a CSP realm) for the first entity and a consent service running in region 1358 (e.g., a home region in a tenant realm) for the second entity coordinate consent-driven access management tasks for a target set of resources in the cloud partition 1354.

The CSP console 1350 includes control 1360 (labelled "Consent Request" in FIG. 13B) for defining and creating consent requests to be sent to a consent service instance in the region 1356. Consider an example consent request from the CSP (i.e., the requestor) to a tenant, the CSP operator can create and then send the example request by selecting a set of attributes through drop down menus, including a user attribute (e.g., a user ID for the CSP actor-operator), an action attribute (e.g., search logs, host connectivity, and/or the like), a tenant home attribute (e.g., a region identifier for a home region in a tenant's realm), a target set attribute (e.g., identifiers that map to a target set of resources in the tenant's home region), and so forth.

The CSP console 1350 includes control 1362 (labelled "Session Request" in FIG. 13B) for defining and creating session requests to be submitted to an appropriate service instance in the region 1358. Although the target set of resources is located in another region and internal to the cloud partition 1354, the appropriate service instance can use a consent token to access the target set of resources and perform the consented action. For an example session request, the CSP operator can create and then submit the example request by attaching a matching consent token and selecting an identifier for the appropriate service instance. Receiving the example session request in the region 1358 may prompt the appropriate service instance into initiating a session and authorizing the consented action. Once a session commences, the CSP console 1350 submits service requests (e.g., service function calls or messages) to the appropriate service instance in the region 1358 and receives service responses (e.g., messages) from executing the service requests. The CSP console 1350 may generate a window for displaying results 1364 from executing the service requests submitted to the appropriate service instance.

The CSP console 1350 may keep up-to-date a dialog box indicating status information 1366 for previous/current consent requests. Each consent request may be pending, rejected, or approved by the tenant-operator of the cloud partition 1358. The CSP consent 1350 can present a message indicating that approval of the consent request is pending action by the set of one or more users from which to obtain respective approvals.

FIG. 14 illustrates an example sequence of interactions between different components of a system for consent-driven access management in a cloud partition of a cloud environment. As described herein, user principal 1402 and operator 1404 refer to potential actors in first and second entities, respectively, of the cloud environment. Identity data plane API 1406 represents a set of services, including a consent service and an identity service, for governing consent between both entities and managing access to cloud resources. In general, the identity data plane API 1406 is configured to manage users, groups, identity domains, compartments, policies, tagging, and limits. Similar to the consent service described above in great detail, the identity data plane API 1406 facilitates interactions between the user principal 1402 (e.g., the CSP actor-operator) and the tenant-operator 1404. The identity data plane API 1406 manages the approval/disapproval process for any incoming consent requests from the actor-operator, thereby controlling the actor-operator's activity within the tenant's cloud partition, such as for hosting a service in one realm to monitor the health of a different realm.

Both service API 1408 and service API 1410 are APIs for local services running in a CSP home region (e.g., CSP services running in a CSP realm). The user principal 1402, by way of possessing a consent token, may authorize one or both of the above local services to access target resources (e.g., in another realm such as the tenant realm) and perform a consented action on these access-controlled target resources.

The user principal 1402, via the CSP console 1350, starts a consent request by authenticating one or more attributes including an identity for the user principal 1402 or the first entity. Once the consent request is authenticated, the user principal 1402 uses the CSP console 1350 to initiate creation/approval of the consent request via the identity data plane API 1406.

In general, the tenant console 1300 displays pending consent requests and the operator 1404 views and either approves or denies them. Each consent request includes a request to access a target set of resources. The CSP console 1350 calls a consent service function to create the consent request for presentation on the tenant console 1300, and in turn, the operator 1404 either rejects or approves the consent request.

Through the tenant console 1300, the operator 1404 invokes a service call on the identity data plane API 1406 that is configured to transmit a request for a consent token from a consent service. In one embodiment, the consent service authorizes creation of the requested consent token in response to evaluating the consent request against a consent workflow. Via the identity data plane API 1406, the consent service returns to the tenant console 1300 a consent token blob representative of the requested consent token. The operator 1404 can enter their approval, via the tenant console 1300, for transforming the BLOB into an approved/validated consent token.

In addition or as an alternative, the consent service authorizes creation of the requested consent token and then, by way of a function call to the identity data plane API 1406, instructs an identity service to provide the consent token blob to the CSP console 1350. The identity service submits a service call to the CSP console 1350 that ultimately results in presenting, to the user principal 1402, a notification of the successful creation of the consent token. The CSP can consider the consent token blob to be an approved consent token and store that consent token in a local data store. The user principal 1402, via the CSP console 1350, can retrieve the consent token for a number of purposes. For example, as directed by the user principal 1402, the CSP console 1350 can submit a session request with the consent token as an attachment.

Submitting the session request to the service API 1408 activates the consent token and causes a consent session to commence. By doing so, the user principal 1402 can leverage the token as evidence of a proper authorization for accessing and/or searching logs. While the session is active, the user principal 1402 submits, to the service API 1408, a service request for starting a log search (as part of the consented action). Based on the presence of the consent token and the session token, the service API 1408 can safely authorize the log search and return any log search results to the CSP console 1350 for presentation to the user principal 1402.

Similarly, the CSP console 1350, on behalf of the user principal 1402, can execute a function call that activates the consent token and also initiates a consent session with the service API 1410 for operating a matrix service. The user principal 1402 provides input directing performance of a matrix search through the service API 1410. The service API 1410 may verify a scope of the matrix search based on the activated consent token, prior to approving transmission/presentation of any matrix search results to/on the CSP console 1350.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

receiving, from a requestor, a consent request for consent for an actor to access a target set of resources in a cloud environment;

identifying a consent workflow that specifies at least one of a name or an attribute of a set of one or more users from which to obtain respective approvals of the consent request;

traversing the consent workflow to obtain the respective approvals from the set of one or more users;

determining that one or more access policies, separate from the consent workflow, permit the actor to access the target set of resources;

granting a consent token responsive to obtaining the respective approvals;

transmitting a first request to access the target set of resources, the first request comprising the consent token;

wherein access by the actor to the target set of resources is conditioned on both (a) obtaining the respective approvals from the set of one or more users and (b) determining that the one or more access policies, separate from the consent workflow, permit the actor to access the target set of resources;

wherein granting or denying the first request to access the target set of resources is conditioned, at least in part, on presence of the consent token; and wherein the method is performed by at least one device including a hardware processor.

2. The method of claim 1, wherein granting or denying the first request to access the target set of resources is further conditioned on verifying the one or more access policies based on the consent token.

3. The method of claim 1, wherein granting or denying the first request to access the target set of resources is further conditioned on verifying, by an identity service, a scope of consent associated with the consent token.

4. The method of claim 1, further comprising:

storing, by an identity service in association with granting the consent token, information indicating a scope of consent associated with the consent token.

5. The method of claim 1:

wherein the consent token is activated for a first predetermined amount of time from when the consent token is granted;

wherein the consent token, when activated, is valid for a second predetermined amount of time.

6. The method of claim 1, wherein a first entity manages the one or more access policies and a second entity manages the consent workflow.

7. The method of claim 1, wherein the requestor is associated with a first entity and the set of one or more users from which to obtain respective approvals is associated with a second entity.

8. The method of claim 7:

wherein the first entity is a cloud service provider;

wherein the first entity controls, at least in part, access by the second entity to the cloud environment;

wherein the second entity controls, at least in part, access to a partition of the cloud environment by a third entity.

9. The method of claim 7:

wherein the first entity is a cloud service provider;

wherein the first entity bills the second entity for use of the cloud environment;

wherein the second entity bills a third entity for use of the cloud environment.

10. The method of claim 1, wherein the consent workflow corresponds to one of:

(a) standing consent, wherein the consent request is pre-approved by the set of one or more users;

(b) on-demand consent, wherein obtaining the respective approvals from the set of one or more users requires user input from the set of one or more users responsive to the consent request; or (c) quorum consent, wherein obtaining the respective approvals from the set of one or more users requires approval of at least a minimum number of the set of one or more users.

11. The method of claim 1, wherein the consent workflow evaluates a condition that is based on state data at a time of the consent request.

12. The method of claim 1, further comprising:

detecting a situation in which the consent request would be denied in the absence of one or more override conditions;

determining if the one or more override conditions is satisfied;

responsive to determining that the one or more override conditions is satisfied:

authorizing the requestor to obtain consent to access the target set of resources in the cloud environment.

13. The method of claim 1, wherein the consent request comprises one or more search attributes that map to the target set of resources in the cloud environment.

14. The method of claim 1, wherein the requestor is the actor.

15. The method of claim 1, further comprising:

receiving, by the requestor from the actor, a second request to access the target set of resources in the cloud environment;

responsive to the second request to access the target set of resources in the cloud environment: generating, by the requestor, the consent request on behalf of the actor.

16. The method of claim 1, further comprising:

receiving, via a first console, user input that selects the consent workflow from among a plurality of available consent workflows;

wherein the requestor receives the consent request via a second console that is separate from the first console.

17. The method of claim 16, further comprising:

presenting, in the second console, a message indicating that approval of the consent request is pending action by the set of one or more users from which to obtain respective approvals.

18. A system comprising:

one or more hardware processors;

one or more non-transitory computer-readable media; and program instructions stored on the one or more non-transitory computer-readable media which, when executed by the one or more hardware processors, cause the system to perform operations comprising:

receiving, from a requestor, a consent request for consent for an actor to access a target set of resources in a cloud environment;

identifying a consent workflow that specifies at least one of a name or an attribute of a set of one or more users from which to obtain respective approvals of the consent request;

traversing the consent workflow to obtain the respective approvals from the set of one or more users;

determining that one or more access policies, separate from the consent workflow, permit the actor to access the target set of resources;

granting a consent token responsive to obtaining the respective approvals;

transmitting a first request to access the target set of resources, the first request comprising the consent token;

wherein access by the actor to the target set of resources is conditioned on both (a) obtaining the respective approvals from the set of one or more users and (b) determining that the one or more access policies, separate from the consent workflow, permit the actor to access the target set of resources;

wherein granting or denying the first request to access the target set of resources is conditioned, at least in part, on presence of the consent token.

19. One or more non-transitory computer-readable media storing instructions which, when executed by one or more hardware processors, cause performance of operations comprising:

receiving, from a requestor, a consent request for consent for an actor to access a target set of resources in a cloud environment;

identifying a consent workflow that specifies at least one of a name or an attribute of a set of one or more users from which to obtain respective approvals of the consent request;

traversing the consent workflow to obtain the respective approvals from the set of one or more users;

determining that one or more access policies, separate from the consent workflow, permit the actor to access the target set of resources;

granting a consent token responsive to obtaining the respective approvals;

transmitting a first request to access the target set of resources, the first request comprising the consent token;

wherein access by the actor to the target set of resources is conditioned on both (a) obtaining the respective approvals from the set of one or more users and (b) determining that the one or more access policies, separate from the consent workflow, permit the actor to access the target set of resources;

wherein granting or denying the first request to access the target set of resources is conditioned, at least in part, on presence of the consent token.

* * * * *